(12) United States Patent
Chang et al.

(10) Patent No.: US 8,930,179 B2
(45) Date of Patent: Jan. 6, 2015

(54) RECOGNITION USING RE-RECOGNITION AND STATISTICAL CLASSIFICATION

(75) Inventors: Shuangyu Chang, Fremont, CA (US); Michael Levit, San Jose, CA (US); Bruce Buntschuh, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 722 days.

(21) Appl. No.: 12/477,918

(22) Filed: Jun. 4, 2009

(65) Prior Publication Data

US 2010/0312546 A1  Dec. 9, 2010

(51) Int. Cl.
*G06F 17/27* (2006.01)

(52) U.S. Cl.
USPC .................... 704/9; 704/255; 704/257

(58) Field of Classification Search
USPC ......... 704/231, 235, 246, 243, 244, 250, 251, 704/255, 233, 257, 9
See application file for complete search history.

(56) References Cited

U.S. PATENT DOCUMENTS

| | | | |
|---|---|---|---|
| 5,390,279 A | 2/1995 | Strong | |
| 5,677,990 A | 10/1997 | Junqua | |
| 6,122,613 A * | 9/2000 | Baker | 704/235 |
| 6,434,524 B1 | 8/2002 | Weber | |
| 6,526,380 B1 * | 2/2003 | Thelen et al. | 704/251 |
| 6,973,429 B2 | 12/2005 | Smith | |
| 7,184,957 B2 * | 2/2007 | Brookes et al. | 704/246 |
| 7,409,349 B2 | 8/2008 | Wang et al. | |
| 8,364,481 B2 * | 1/2013 | Strope et al. | 704/231 |
| 2001/0037200 A1 | 11/2001 | Ogawa et al. | |
| 2003/0125948 A1 | 7/2003 | Lyudovyk | |
| 2004/0059575 A1 | 3/2004 | Brookes et al. | |
| 2006/0190258 A1 | 8/2006 | Verhasselt et al. | |

FOREIGN PATENT DOCUMENTS

| | | |
|---|---|---|
| CN | 1351744 A | 5/2002 |
| CN | 101228577 A | 7/2008 |
| JP | S62-65089 A | 3/1987 |
| JP | S63-46496 A | 2/1988 |
| JP | 2000-181487 A | 6/2000 |
| JP | 2002-540478 A | 11/2002 |

(Continued)

OTHER PUBLICATIONS

McMillian, et al., "Distributed Listening: A Parallel Processing Approach to Automatic Speech Recognition", retrieved at <<http://www.aclweb.org/anthology-new/P/P08/P08-2044.pdf>>, Proceedings of ACL-08: HLT, Short Papers (Companion Volume), Jun. 2008, pp. 173-176.

(Continued)

*Primary Examiner* — Huyen X. Vo
(74) *Attorney, Agent, or Firm* — Steve Spellman; Peter Taylor; Micky Minhas (57) ABSTRACT

Architecture that employs an overall grammar as a set of context-specific grammars for recognition of an input, each responsible for a specific context, such as subtask category, geographic region, etc. The grammars together cover the entire domain. Moreover, multiple recognitions can be run in parallel against the same input, where each recognition uses one or more of the context-specific grammars. The multiple intermediate recognition results from the different recognizer-grammars are reconciled by running re-recognition using a dynamically composed grammar based on the multiple recognition results and potentially other domain knowledge, or selecting the winner using a statistical classifier operating on classification features extracted from the multiple recognition results and other domain knowledge.

22 Claims, 9 Drawing Sheets

(56) References Cited

FOREIGN PATENT DOCUMENTS

| JP | 2003-029783 A | 1/2003 |
|---|---|---|
| JP | 2006-039382 A | 2/2006 |
| JP | 2011-527030 A | 10/2011 |
| WO | 0054252 A2 | 9/2000 |

OTHER PUBLICATIONS

Amornkul, et al., "N-Best Decision for Thai Stressed Speech Recognition with Parallel Hidden Markov Model", Retrieved at <<http://ieeexplore.ieee.org/stamp/stamp.jsp?arnumber=01595337>>, Proceedings of 2005 International Symposium on Intelligent Signal Processing and Communication Systems, Dec. 13-16, 2005, pp. 25-28.

Fiscus, Jonathan G., "A Post-Processing System to Yield Reduced Word Error Rates: Recognizer Output Voting Error Reduction (ROVER)", Retrieved at <<http://citeseer.ist.psu.edu/cache/papers/cs/23369/http:zSzzSzwww.nist.govzSzspeechzSzpublicationszSzpapersrczSzrover.pdf/fiscus97postprocessing.pdf>>, Feb. 1997.

"International Search Report", Mailed Date: Dec. 28, 2010, Application No. PCT/US2010/036964, Filed Date: Jun. 1, 2010, pp. 8. (MS# 327043.02).

Fiscus, Jonathan G., "A Post-Processing System to Yield Reduced Word Error Rates: Recognizer Output Voting Error Reduction (ROVER)", In Proceedings of IEEE Workshop on Automatic Speech Recognition and Understanding, Dec. 14-17, 1997, pp. 347-354.

Acero, et al., "Live Search for Mobile: Web Services by Voice on the Cellphone", Proceedings of the International Conference on Acoustics, Speech, and Signal Processing, retrieved at <<http://research.microsoft.com/en-us/um/people/gzweig/pubs/icassp08d.pdf>>, Apr. 2008, 4 pages.

"Office Action Issued in Japanese Patent Application No. 2012-514054", Mailed Date: May 27, 2014, Filed Date: Jun. 1, 2010, 13 Pages.

"Office Action Issued in Australian Patent Application No. 2010256788", Mailed Date: Apr. 1, 2014, Filed Date: Jun. 1, 2010, 3 Pages.

"First Office Action Issued in Chinese Patent Application No. 201080025833.3", Mailed Date: Jan. 13, 2014, Filed Date: Jun. 1, 2010, 15 Pages.

Response filed to Examiner's Report—Australian Patent Application No. 2010256788, dated Aug. 14, 2014, 2 pages.

"Office Action Issued in Australian Patent Application No. 2010256788", Mailed Date: Jul. 9, 2014, 3 pages.

"Office Action Issued in Chinese Patent Application No. 201080025833.3", Mailed Date: Aug. 6, 2014, 11 pages.

Response filed for second Office Action—China Patent Application No. 201080025833.3, dated Oct. 20, 2014, 12 pages.

"Third Office Action and Search Report Received for China Patent Application No. 201080025833.3", Mailed Date: Nov. 15, 2014, 14 pages.

* cited by examiner

RECOGNITION USING RE-RECOGNITION AND STATISTICAL CLASSIFICATION

BACKGROUND

Speech recognition performance is oftentimes suboptimal when a large grammar search space is involved, such as a voice search task that covers a large number of business names, web search queries, voice dialing requests, etc. Three main suboptimalities that are often exhibited include long recognition latency, poor recognition accuracy, and insufficient grammar coverage.

One existing mobile voice search application uses a nationwide business listing grammar plus a locality grammar at the first stage and re-recognizes the same utterance using a locality-specific business listing grammar at the second stage (where the locality was determined in the first stage). This approach does not address the latency issue, but can improve coverage and accuracy in very specific situations. Another approach attempts to reduce word error rate by voting among outputs of distinct recognizers at the sub-utterance level. The approach and its extensions generally assume each recognizer attempts recognition with a complete grammar for the entire task.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture takes an input for recognition and applies different instances of context-specific constraints to the input for recognition processing. The separate constraint instances taken together provide the overall context domain for the given input. By operating recognition in parallel, for example, against these constraint instances, recognition latency, recognition accuracy, and recognition domain coverage are improved. Moreover, recognition processing of the separate recognition paths can be managed by imposing time limitations on how long the system will wait for a result to be produced.

In the context of speech recognition, the architecture employs an overall grammar in the form of a disjunction of smaller individual context-specific grammars for recognition of an utterance input, each responsible for a specific context, such as subtask category, geographic region, etc. The grammars together cover the entire domain. Moreover, multiple recognitions can be run in parallel against the same input, where each recognition path uses one or more of the context-specific grammars.

The multiple intermediate recognition results from the different recognizer-grammars paths are reconciled by running re-recognition using a dynamically composed grammar based on the multiple recognition results and potentially other domain knowledge, or selecting the winner using a statistical classifier operating on classification features extracted from the multiple recognition results and other domain knowledge.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture is a recognition system that first performs independent recognition of the same input (e.g., utterance) using context specific constraints. These independent recognitions can be performed either serially or in parallel. The context specific constraints are each smaller than a constraint that attempts to unify all domain knowledge. Reconciliation of the multiple recognition results can be accomplished using subsequent recognition (re-recognition) and/or via statistical classification.

The architecture addresses problems of recognition latency, recognition accuracy, and insufficient grammar coverage associated with a traditional single-grammar, single-recognition approach. With respect to recognition latency, each recognition instance in the parallel recognition is against a smaller grammar than a single large grammar that can cover the same tasks. Furthermore, the re-recognition step is against a small dynamic grammar. The two combined recognition stages of the maximum latency of the parallel recognitions, for example, plus the latency of re-recognition can have a smaller latency than recognition with single large grammar, particularly in non-streaming cases.

With a single recognition, recognition accuracy is oftentimes lost due to pruning during hypothesis search. Having multiple recognitions alleviates this limitation as a much larger hypothesis set can be maintained. In addition, context-specific constraints such as grammars are more likely to have better accuracy on utterances, for example, from the target context than a single, general grammar covering many contexts. Thus, there is a greater chance that the results from the multiple recognitions contain the correct result, and reconciling the multiple recognition results with re-recognition or a classifier is more likely to generate the correct result than a one-grammar, single-recognition approach.

With respect to insufficient grammar coverage, for example, there are oftentimes practical limitations (e.g., hardware, software) on how large a single grammar can be and/or how large grammars in a single recognition can be. Running multiple recognitions in parallel, for example, can significantly increase total grammar coverage, since each recognition can potentially run on distinct software processes and/or hardware resources.

Consider application of the disclosed architecture to a large-scale speech recognition task. The following example illustrates the concept by using a voice search task as an example, which can include an open-ended search of the web, local businesses, personal contacts, etc. Variants and enhancements are possible to various parts of the solution.

The recognition grammar is provided as a number of smaller and possibly overlapping context-specific grammars, each covering a specific subset of the original task space. The context for division can be based on subtask category (e.g., business names versus movie titles), geographic location (e.g., businesses in California versus in New York), demographic origins (e.g., youth oriented versus mature content), etc. Each content-specific grammar can be built separately, leveraging knowledge, structure and other available information relevant for each context to maximize the success rate for expected user inputs from each context.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
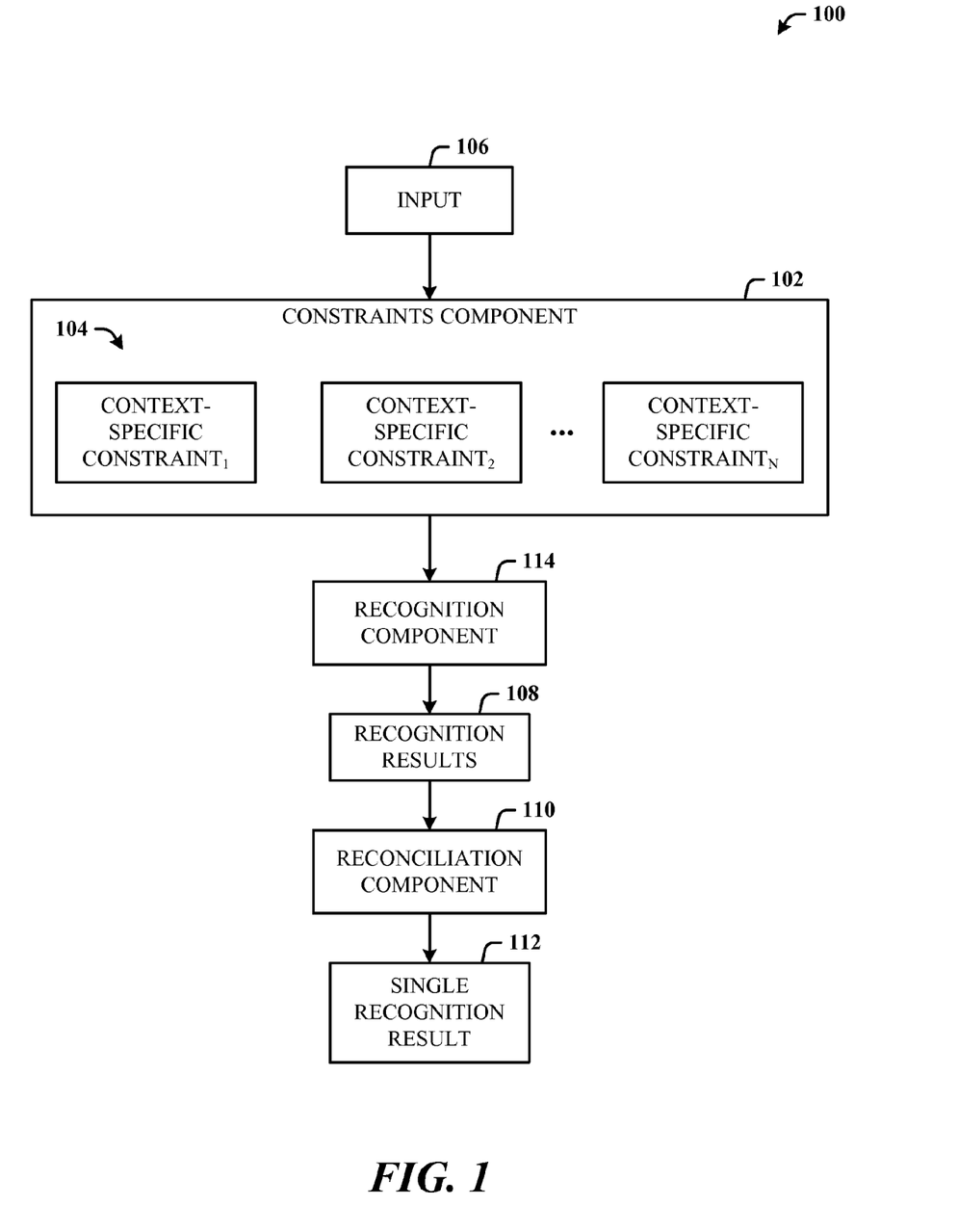
FIG. 1 illustrates a computer-implemented recognition system in accordance with the disclosed architecture.

FIG. 1 illustrates a computer-implemented recognition system 100 in accordance with the disclosed architecture. The system 100 includes a constraints component 102 of context-specific constraints 104 for recognition processing of an input 106 into recognition results 108, and a reconciliation component 110 for reconciling the recognition results 108 into a single recognition result 112.

The system 100 can further comprise a recognition component 114 for separate recognition processing of corresponding context-specific constraints 104 in parallel paths and/or serially. For example, the context-specific constraints 104 can include grammars for recognition processing of the grammars against the input 106 in parallel paths and/or serial paths. The individual sets of context-specific constraints 104 can include disjointed and intersecting context coverage. In other words, one set of constraints can have some overlap with constraints of another constraint set. It is also the case where some constraints sets do not overlap with constraints of other constraint sets.

The reconciliation component 110 can reconcile the recognition results 108 using re-recognition to generate the single recognition result 112, by employing a dynamically composed grammar based on the recognition results 108.

Alternatively the reconciliation component 110 can reconcile the results 108 using a statistical classifier that operates on classification features extracted from the recognition results 108 to generate the single recognition result 112.

The reconciliation processing can also process relevant task data to arrive at the single recognition result 112. The relevant task data can include at least one of recognized strings, utterance level and sub-utterance level confidence scores, speech coverage, relative latencies among concurrent recognitions, prior probabilities of contexts, relative difficulty of each recognition, or consensus among the recognition results. In addition, a number of handcrafted and/or automatically derived rules reflecting specific requirements of the task can influence the reconciliation process of multiple recognition hypotheses.

Figure 2:
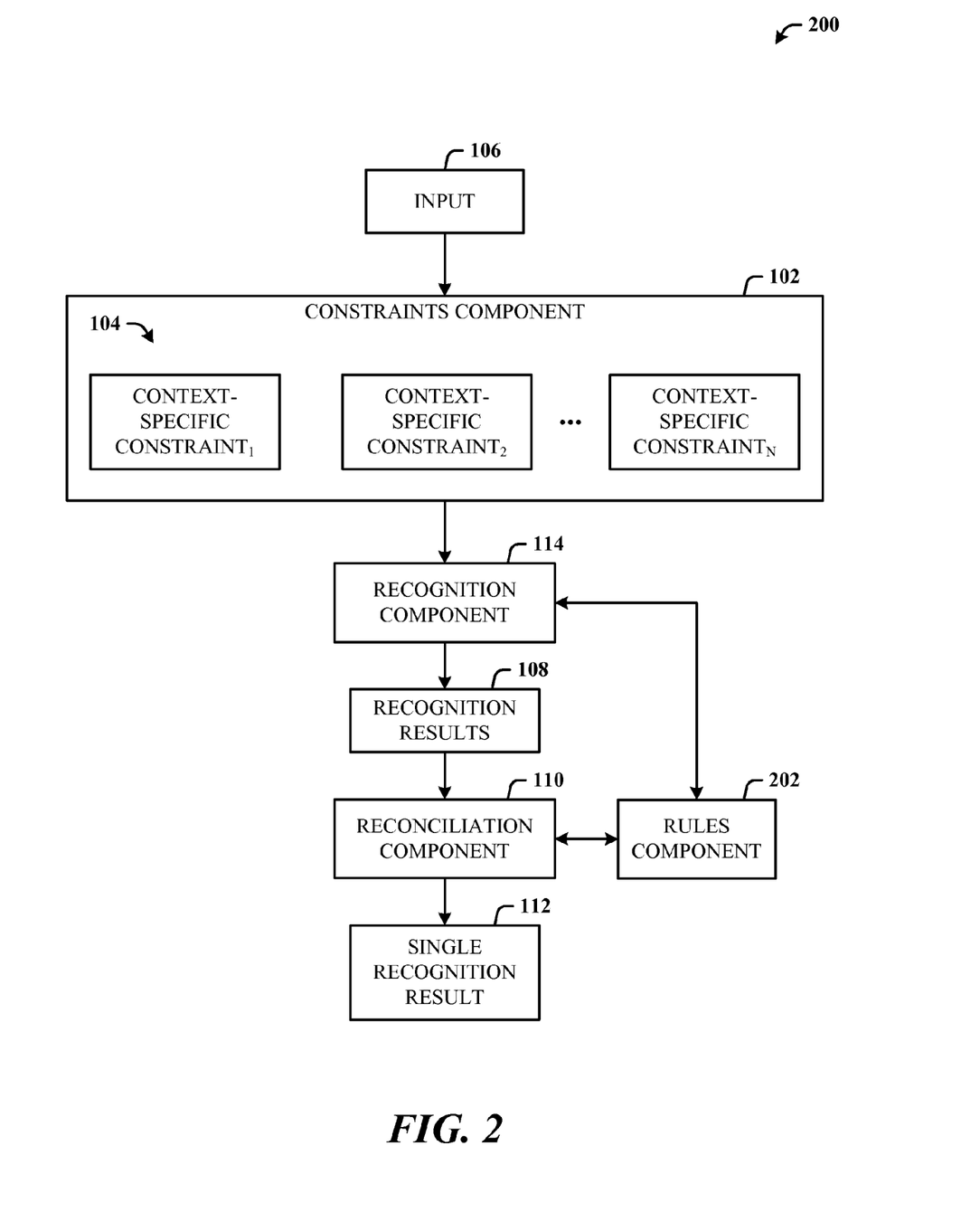
FIG. 2 illustrates an alternative embodiment of a system that employs rules for determination of the single recognition result.

FIG. 2 illustrates an alternative embodiment of a system 200 that employs rules for determination of the single recognition result 112. The system 200 includes the constraints component 102 of context-specific constraints 104 for recognition processing of the input 106 into the recognition results 108, and the reconciliation component 110 for reconciling the recognition results 108 into the single recognition result 112, and the recognition component 114 for separate recognition processing of corresponding context-specific constraints 104 in parallel paths and/or serially.

A rules component 202 is provided to apply rules (e.g., priority) for declaring one or more of the recognition results 108 and/or the single recognition result 112 (e.g., a final result). For example, a rule can be created and applied that determines if a specific recognizer returns a particular result with a sufficiently high confidence score, then that result can be accepted as final for that corresponding recognizer process or even for the single recognition result 112.

Figure 3:
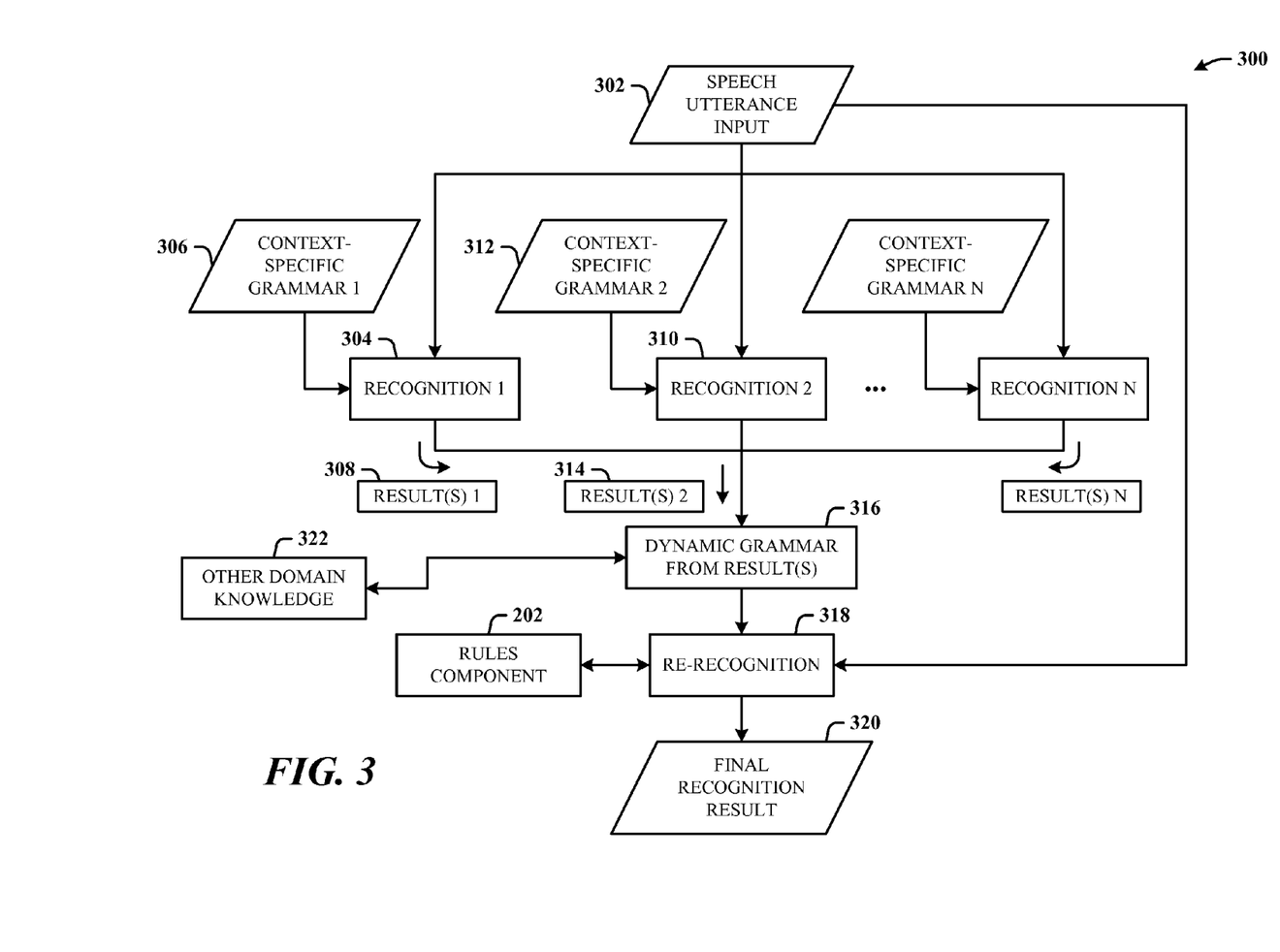
FIG. 3 illustrates a context-specific constraints recognition system that employs re-recognition and where the constraints are grammars for voice recognition.

FIG. 3 illustrates a context-specific constraints recognition system 300 that employs re-recognition and where the constraints are grammars for voice recognition. The system 300 includes N recognition-grammar pairs operating in parallel, where each pair includes one or more context-specific grammars and a recognizer (denoted Recognition N). As illustrated, the grammars are different; however, there may be some overlap of one grammar to another grammar, although this is not necessary. Rather than creating and utilizing one large grammar, as in existing recognition systems, the system 300 retains the separate grammars (instead of merging into one large grammar), and runs recognition of a speech utterance input 302 on each of the grammars.

In other words, the utterance input 302 is processed through a first recognizer 304 and associated first context-specific grammar 306 producing first result(s) 308, as well as through a second recognizer 310 and associated second context-specific grammar 312 producing second result(s) 314, and so on, to the desired number N of recognizers and grammars thereby producing N result(s). The result(s) are utilized to generate a dynamic grammar 316, which can then be used for re-recognition 318 to output a final recognition result 320.

Put another way, with the user utterance input 302, a separate recognition is run against each of the context-specific grammars. This is illustrated as occurring in a parallel fashion at the same time or approximately the same time. Each of the parallel recognitions can employ the same kind or a different kind of recognizer (e.g., embedded versus network recognizers, network recognizers with different acoustic models, etc.), and use the same or different recognition parameters. Up to a maximum waiting period, the system 300 collects all available recognition results (e.g., result(s) 308, result(s) 314, etc.) and determines the final recognition result 320 by re-recognition.

The dynamic grammar 316 is constructed to include competing entries derived from all recognition results, which can include recognition strings, interpretations, and confidence scores, of the N-best recognition results, and/or recognition lattice, if available. Re-recognition of the original utterance input 302 is performed against this dynamic grammar 316. The result of the re-recognition 318, including confidence scores, is taken as the final recognition result 320.

Optionally, certain priority rules can be included by the rules component 202 to declare the final recognition result 320 before all recognitions are completed, such as if a certain recognizer returns a particular result with a sufficiently high confidence score, this result can be accepted as final. Optionally, other domain knowledge 322 that is relevant to the task can be provided as input to the dynamic grammar to provide a more focused recognition process. This knowledge 322 can include user preferences, content related to what is being said in the utterance, hardware/software considerations, locality, and so on.

Figure 4:
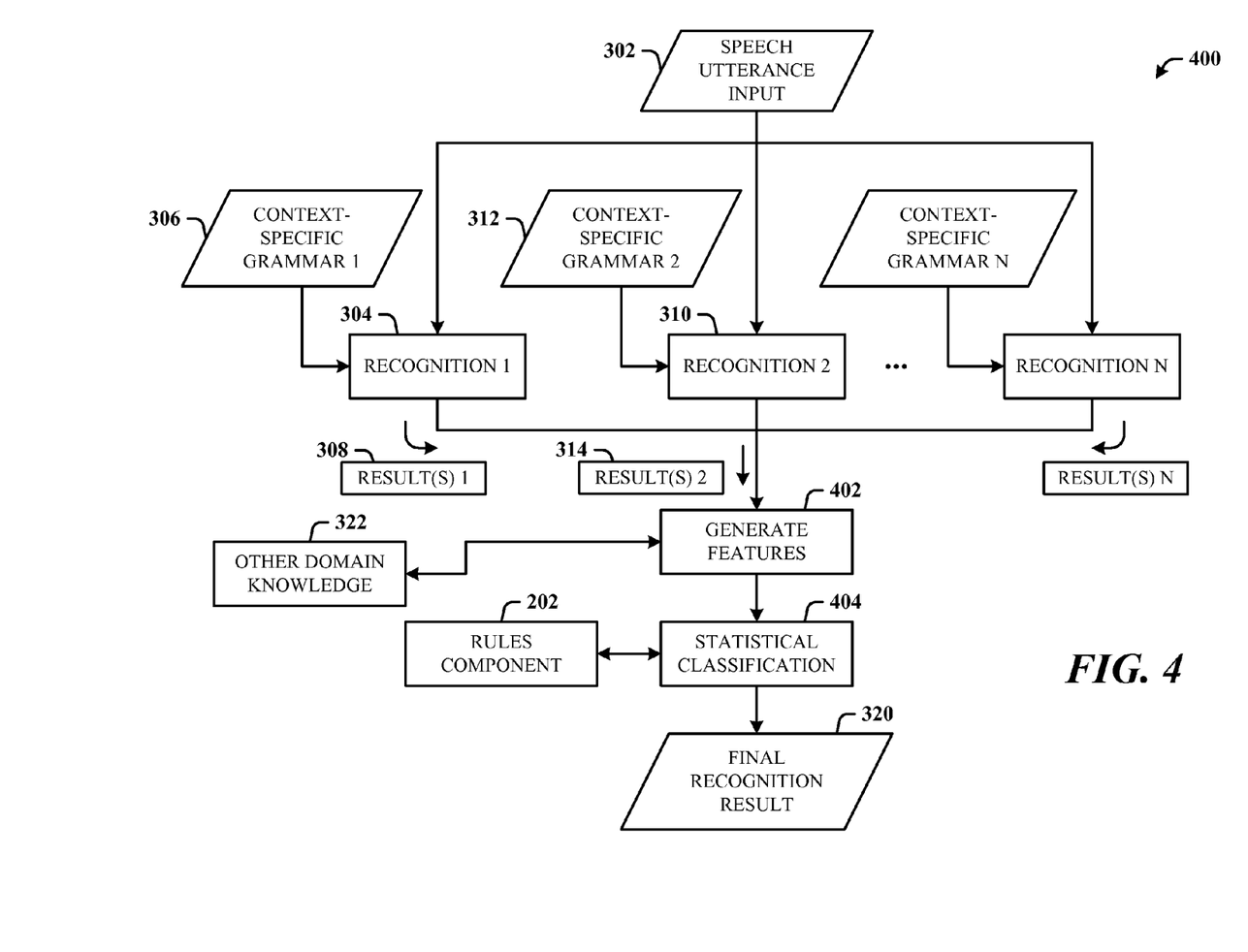
FIG. 4 illustrates a context-specific constraints recognition system that employs statistical classification and where the constraints are grammars for parallel voice recognition.

FIG. 4 illustrates a context-specific constraints recognition system 400 that employs statistical classification and where the constraints are grammars for voice recognition in parallel. Multiple numerical and/or categorical features 402 can be derived from all recognition results (e.g., result(s) 308, result(s) 314, etc.), and potentially, the other domain knowledge 322 relevant for the recognition task. A statistical classifier is used to determine how likely each result reflects the actual user input. The result with the highest classification score can be selected as the final recognition result 320 and the classification score can be normalized to be the final recognition confidence.

The system 400 includes the N recognition-grammar pairs operating in parallel, where each pair includes a context-specific grammar (denoted Context-Specific Grammar N) and a recognizer (denoted Recognition N). As previously illustrated and described, the grammars are different; however, there may be some overlap of one grammar to another grammar, although this is not necessary. Rather than creating and utilizing one large grammar, as in existing recognition systems, the system 400 retains the separate grammars (instead of merging into one large grammar), and runs recognition of the speech utterance input 302 on each of the grammars.

In other words, the utterance input 302 is processed through the first recognizer 304 and associated first context-specific grammar 306 producing the first result(s) 308, as well as through a second recognizer 310 and associated second context-specific grammar 312 producing the second result(s) 314, and so on, to the desired number N of recognizers and grammars thereby producing N result(s). The result(s) (Result(s) 308, Result(s) 314, . . . , Result(s) N) are utilized to generate features 402, which are then passed to statistical classification 404 for the final recognition result 320.

As previously illustrated and described in FIG. 3, optionally, certain priority rules can be included by the rules component 202 to declare the final recognition result 320 before all recognitions are completed, such as if a certain recognizer returns a particular result with a sufficiently high confidence score, this result can be accepted as final. Optionally, the other domain knowledge 322 that is relevant to the task can be provided as input to the dynamic grammar to provide a more focused recognition process. This knowledge 322 can include user preferences, content related to what is being said in the utterance, hardware/software considerations, locality, and so on.

Note that the description herein covers how the architecture works when receiving a user input utterance online. Another aspect of the solution is to choose the appropriate settings, features, etc., used by the system, particularly during the reconciliation of multiple recognition results. For both the re-recognition and the statistical classifier approaches, training data can be utilized and an offline training process can be employed to select an optimal configuration and parameterization.

For the re-recognition approach, it is also possible to optionally perform a statistical analysis such as regression to assign relative weights to paths in the re-recognition dynamic grammar. The output of the other domain knowledge 322 can be controlled to influence the dynamic grammar 316 for each re-recognition process.

In either approach, one or more of the following features 402 can be employed, some features directly obtained from parallel recognition results, and other features derived from relevant task knowledge. The features 402 can include, but are not limited to, recognized strings, utterance level and sub-utterance level confidence scores, speech coverage (e.g., fraction of an utterance hypothesized as speech), relative latencies among the recognitions (e.g., parallel), prior probabilities of contexts (e.g., how often users ask for business names versus sports scores), relative difficulty of each context-specific recognition (e.g., perplexity of the context-specific grammars, within context recognition accuracy), admissibility of each grammar (e.g., web search grammar can accept a large variety of queries), and consensus among the recognition results.

Note that the individual recognition processes can be distributed across different machines such as server, clients, or a combination of servers and clients. This applies to parallel recognition as well as serial recognition in both classification and re-recognition scenarios.

Put another way, the disclosed architecture is a computer-implemented recognition system that comprises the constraints component of context-specific grammars for recognition processing of an utterance input into recognition results, the recognition component for individual recognition processing of the utterance input in parallel paths using corresponding context-specific grammars, and the reconciliation component for reconciling the recognition results into a final recognition result.

The reconciliation component employs a dynamically composed grammar of the recognition results and reconciles the recognition results using re-recognition to generate the final recognition result. Optionally, the reconciliation component reconciles the recognition results by employing statistical analysis such as regression prior to re-recognition to determine the final recognition result. Alternatively, the reconciliation component reconciles the recognition results using statistical classification that operates on features extracted from the recognition results to generate the final recognition result. In addition, the rules component imposes one or more rules that define determination of the final recognition result and, other domain knowledge can influence features for statistical classification reconciliation and a dynamic grammar for re-recognition reconciliation.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
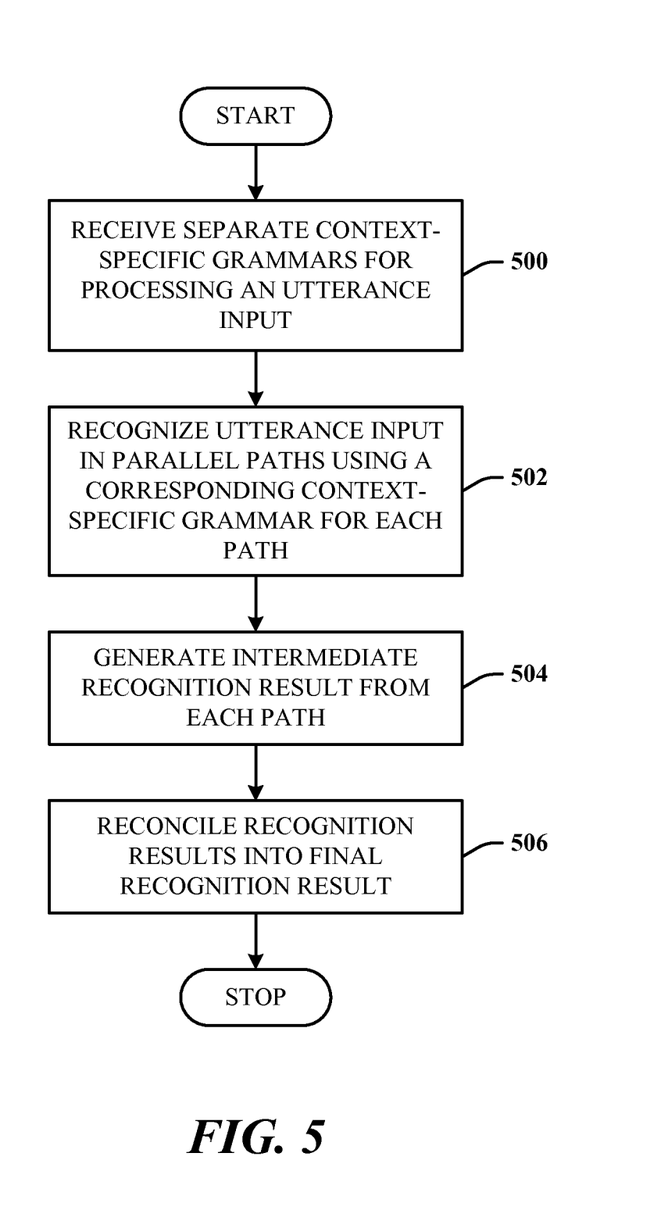
FIG. 5 illustrates a computer-implemented recognition method.

FIG. 5 illustrates a computer-implemented recognition method. At 500, separate context-specific grammars are received for processing an utterance input. At 502, the utterance input is recognized in parallel paths using a corresponding context-specific grammar for each path. At 504, an intermediate recognition result is generated from each path. At 506, the intermediate recognition results are reconciled into a final recognition result.

Figure 6:
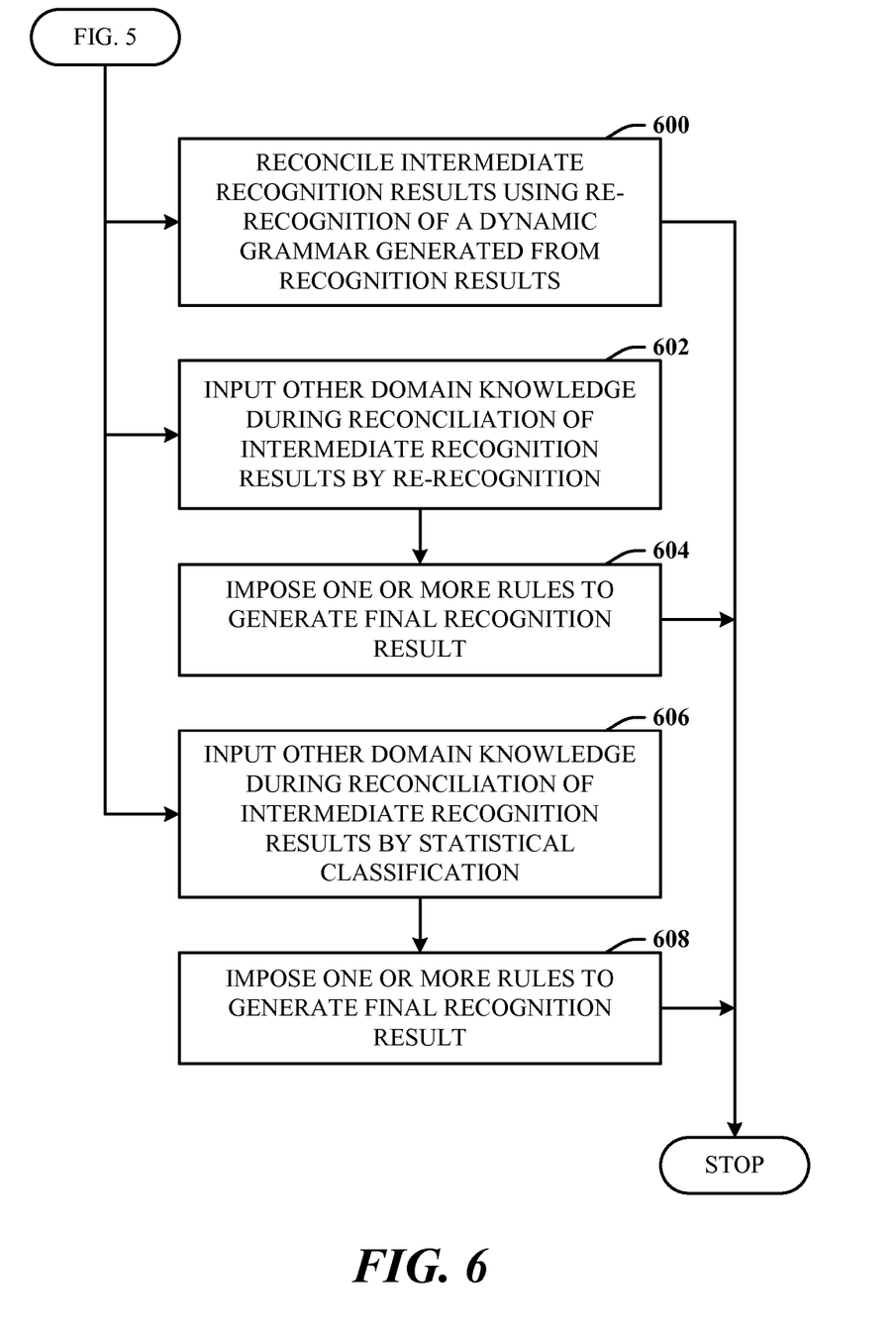
FIG. 6 illustrates further aspects of the method of FIG. 5.

FIG. 6 illustrates further aspects of the method of FIG. 5. At 600, the intermediate recognition results are reconciled using re-recognition of a dynamic grammar generated from the recognition results. At 602, other domain knowledge is input during reconciliation of the intermediate recognition results by re-recognition. At 604, one or more rules are imposed to generate the final recognition result. At 606, other domain knowledge is input during reconciliation of the intermediate recognition results by statistical classification. At 608, one or more rules are imposed to generate the final recognition result.

Figure 7:
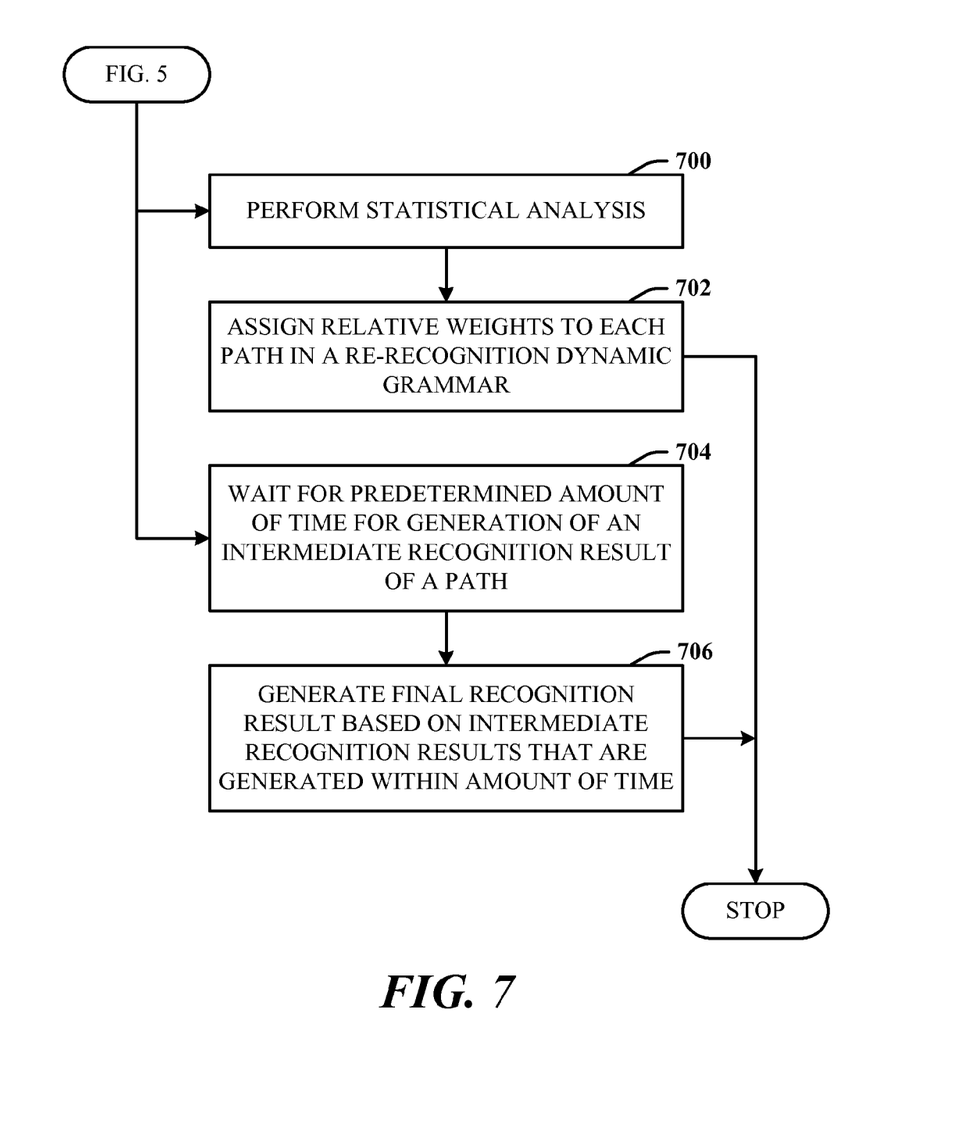
FIG. 7 illustrates additional aspects of the method of FIG. 5.

FIG. 7 illustrates additional aspects of the method of FIG. 5. At 700, statistical analysis such as regression is performed. The analysis is carried out over all paths concurrently. At 702, relative weights are assigned to each path in a re-recognition dynamic grammar. At 704, a predetermined amount of time is waited for generation of an intermediate recognition result of a path. At 706, the final recognition result is generated based on intermediate recognition results that are generated within the amount of time.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
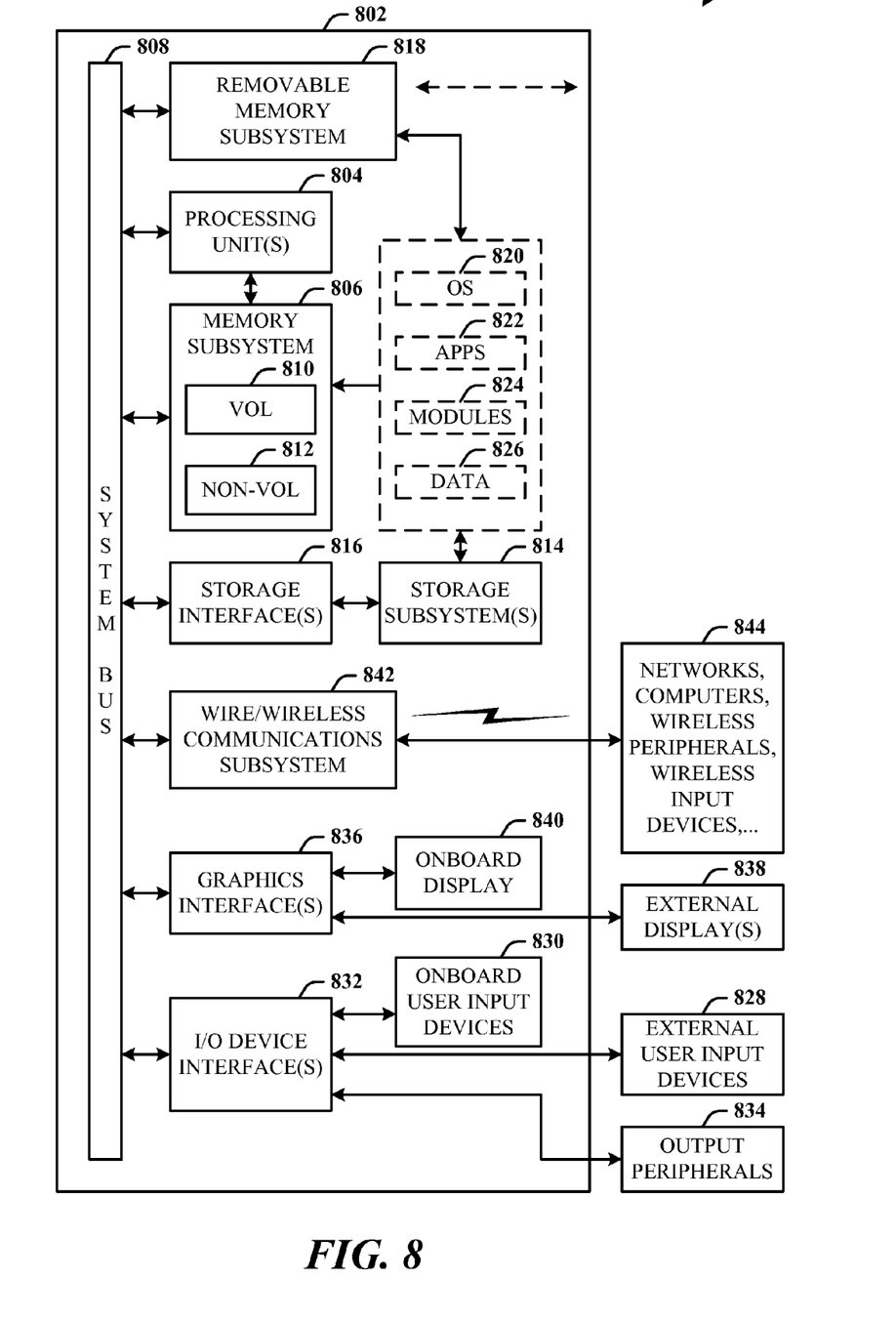
FIG. 8 illustrates a block diagram of a computing system operable to execute recognition in accordance with the disclosed architecture.

Referring now to FIG. 8, there is illustrated a block diagram of a computing system 800 operable to execute recognition in accordance with the disclosed architecture. In order to provide additional context for various aspects thereof, FIG. 8 and the following discussion are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the memory subsystem 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include the components, entities, and results of the system 100 of FIG. 1, the components, entities, and results of the system 200 of FIG. 2, the components, entities, and results of the system 300 of FIG. 3, the components, entities, and results of the system 400 of FIG. 4, and the methods and additional aspects provided in FIGS. 5-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile media, removable and non-removable media. For the computer 802, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP) using logical connections via a wired/wireless communications subsystem 842 to one or more networks and/or other computers. The other computers can include workstations, servers, routers, personal computers, microprocessor-based entertainment appliance, a peer device or other common network node, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or has other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
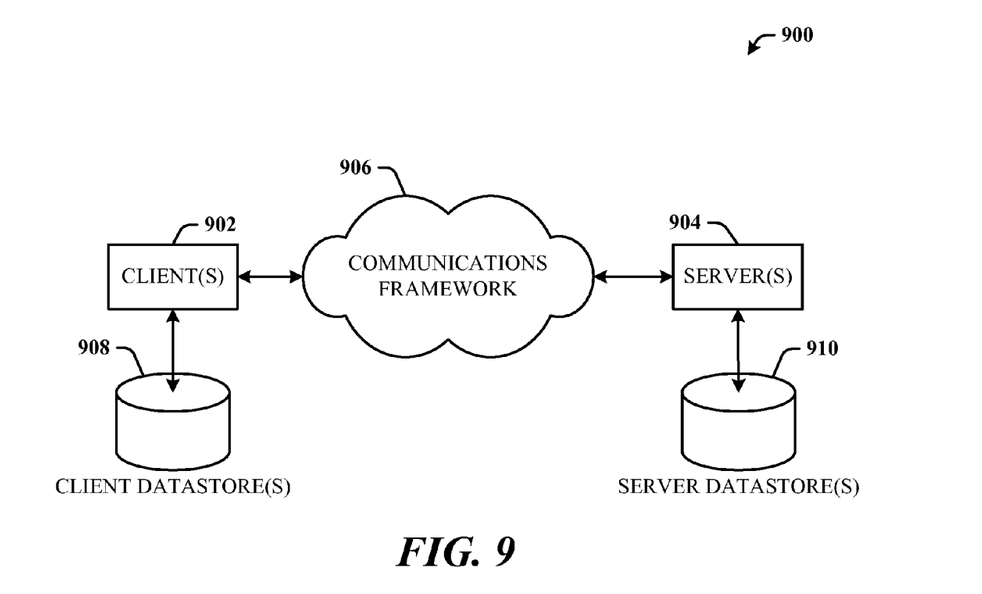
FIG. 9 illustrates a schematic block diagram of a computing environment that provides parallel recognition in accordance with the disclosed architecture.

Referring now to FIG. 9, there is illustrated a schematic block diagram of a computing environment 900 that provides parallel recognition in accordance with the disclosed architecture. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

The client(s) 902 can include a client via which voice signals are received for recognition processing by the server (s) 904 or other client(s) 902. The grammars can be stored in the client datastore(s) 908 and/or the server datastore(s) 910.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented recognition system, comprising:
   a constraints component of multiple context-specific constraints configured to perform independent recognition processing of a same input along multiple recognition paths into respective multiple recognition results, wherein separate constraint instances taken together provide an overall context domain for the input;
   a reconciliation component configured to generate a dynamic grammar using the multiple recognition results, and configured to perform regression analysis to assign relative weights to each of the recognition paths in the dynamic grammar and to determine a final recognition result; and
   a microprocessor configured to execute computer-executable instructions in a memory associated with the constraints component and the reconciliation component.

2. The system of claim 1, wherein the constraints include grammars for recognition processing of the input in parallel paths.

3. The system of claim 1, wherein the reconciliation component reconciles the results using re-recognition to generate the single recognition result.

4. The system of claim 3, wherein the re-recognition employs the dynamically composed grammar based on the recognition results.

5. The system of claim 1, wherein the reconciliation component reconciles the results using a statistical classifier that operates on classification features extracted from the recognition results to generate the single recognition result.

6. The system of claim 1, wherein the context-specific constraints include disjointed and intersecting context coverage.

7. The system of claim 1, wherein the recognition processing processes relevant task data to arrive at the single recognition result, the relevant task data includes at least one of recognized strings, utterance level and sub-utterance level confidence scores, speech coverage, relative latencies among concurrent recognitions, prior probabilities of contexts, relative difficulty of each recognition, or consensus among the recognition results.

8. The system of claim 1, further comprising a recognition component configured for separate recognition processing of the input using a corresponding context-specific constraint in each of parallel paths.

9. The system of claim 1, further comprising a rules component configured to impose one or more rules that define determination of the single recognition result.

10. A computer-readable storage device comprising computer-executable instructions that when executed by a processor enable a recognition system, comprising:
a constraints component of multiple context-specific constraints configured to perform independent recognition processing of a same input along multiple recognition paths into respective multiple recognition results, wherein separate constraint instances taken together provide an overall context domain for the input; and
a reconciliation component configured to generate a dynamic grammar using the multiple recognition results, and configured to perform regression analysis to assign relative weights to each of the recognition paths in the dynamic grammar and to determine a final recognition result.

11. The computer-readable storage device of claim 10, wherein the reconciliation component employs the dynamically composed grammar of the recognition results and reconciles the recognition results using re-recognition to generate the final recognition result.

12. The computer-readable storage device of claim 10, wherein the reconciliation component reconciles the recognition results using classification that operates on features extracted from the recognition results to generate the final recognition result.

13. The computer-readable storage device of claim 10, further comprising a rules component for imposing one or more rules that define determination of the final recognition result and, other domain knowledge that influences features for classification reconciliation and a dynamic grammar for re-recognition reconciliation.

14. The computer-readable storage device of claim 10, wherein the reconciliation component reconciles the recognition results by employing regression analysis prior to re-recognition to determine the final recognition result.

15. A computer-implemented recognition method, performed by a computer system executing machine-readable instructions, the method comprising acts of:
receiving a recognition grammar composed of separate context-specific grammars each covering a specific subset of an original task space, for processing an utterance input;
recognizing the utterance input in parallel paths using a corresponding context-specific grammar for each path;
generating an intermediate recognition result from each path;
generating a dynamic grammar utilizing the intermediate recognition result from each path;
performing regression analysis to assign relative weights to each of the recognition paths in the dynamic grammar and to determine a final recognition result; and
configuring a microprocessor to execute instructions in a memory associated with the acts of receiving, recognizing, generating the intermediate recognition, generating the dynamic grammar, and performing.

16. The method of claim 15, further comprising reconciling the intermediate recognition results using re-recognition of the dynamic grammar generated from the intermediate recognition results.

17. The method of claim 15, further comprising:
inputting other domain knowledge during reconciliation of the intermediate recognition results by re-recognition; and
imposing one or more rules to generate the final recognition result.

18. The method of claim 15, further comprising:
inputting other domain knowledge during reconciliation of the intermediate recognition results by classification; and
imposing one or more rules to generate the final recognition result.

19. The method of claim 15, further comprising:
performing classification analysis; and
assigning relative weights to each path in a re-recognition dynamic grammar.

20. The method of claim 15, further comprising:
waiting for a predetermined amount of time for generation of an intermediate recognition result of a path; and
generating the final recognition result based on intermediate recognition results that are generated within the amount of time.

21. A computer-implemented recognition system, comprising:
a constraints component of multiple context-specific constraints configured to perform independent recognition processing of an input along multiple recognition paths into respective multiple recognition results, wherein separate constraint instances taken together provide an overall context domain for the input;
a reconciliation component configured to generate a dynamic grammar using the multiple recognition results, and configured to perform statistical analysis to assign relative weights to each of the recognition paths in the dynamic grammar and to determine a final recognition result;
a re-recognition component configured to process the input utilizing the dynamic grammar to generate the final recognition result; and
a microprocessor configured to execute computer-executable instructions in a memory associated with the constraints component, the reconciliation component, and the re-recognition component.

22. A computer-implemented recognition method, performed by a computer system executing machine-readable instructions, the method comprising acts of:
  recognizing an utterance input in parallel paths using a recognition grammar that comprises a different or intersecting context-specific grammar for each path;
  generating a dynamic grammar utilizing an intermediate recognition result from one or more of the paths;
  performing statistical analysis to assign relative weights to each of the recognition paths in the dynamic grammar;
  performing re-recognition processing on the utterance input using the dynamic grammar to generate the final recognition result; and
  configuring a microprocessor to execute instructions in a memory associated with the acts of recognizing, generating, performing statistical analysis, and performing re-recognition processing.

\* \* \* \* \*